United States Patent
Forster et al.

(10) Patent No.: US 6,642,897 B2
(45) Date of Patent: Nov. 4, 2003

(54) TUNING TECHNIQUES FOR A SLOT ANTENNA

(75) Inventors: Ian J. Forster, Chelmsford (GB); Peter Robert George Horrell, Chelmsford (GB)

(73) Assignee: Marconi Communications Inc., Warrendale, PA (US)

( * ) Notice: Subject to any disclaimer, the term of this patent is extended or adjusted under 35 U.S.C. 154(b) by 0 days.

(21) Appl. No.: 10/125,786

(22) Filed: Apr. 18, 2002

(65) Prior Publication Data

US 2003/0058180 A1 Mar. 27, 2003

Related U.S. Application Data

(63) Continuation-in-part of application No. 09/536,334, filed on Mar. 25, 2000.

(51) Int. Cl.$^7$ ................................................ H01Q 13/10
(52) U.S. Cl. ...................................... 343/767; 340/539
(58) Field of Search ............................... 343/767, 746; 340/539, 540, 825, 572

(56) References Cited

U.S. PATENT DOCUMENTS

| | | | | |
|---|---|---|---|---|
| 3,961,323 A | 6/1976 | Hartkorn | ..................... | 340/280 |
| 4,051,480 A | 9/1977 | Reggia et al. | ............... | 343/705 |
| 4,086,598 A | 4/1978 | Bogner | ........................ | 343/768 |
| 4,782,345 A | 11/1988 | Landt | ......................... | 343/272 |
| 4,975,711 A | 12/1990 | Lee | ............................. | 343/702 |
| 5,255,819 A | 10/1993 | Peckels | ......................... | 222/1 |
| 5,339,074 A * | 8/1994 | Shindley et al. | ........ | 340/825.31 |
| 5,448,220 A * | 9/1995 | Levy | ............................. | 340/539 |
| 5,461,393 A | 10/1995 | Gordon | ....................... | 343/769 |
| 5,495,218 A | 2/1996 | Erb et al. | .................... | 333/248 |
| 5,507,411 A | 4/1996 | Peckels | ......................... | 222/1 |
| 5,621,419 A | 4/1997 | Meek et al. | ................ | 343/770 |
| 5,691,731 A | 11/1997 | van Erven | ................... | 343/742 |
| 5,774,876 A | 6/1998 | Woolley et al. | ............... | 705/28 |
| 5,864,323 A | 1/1999 | Berthon | ....................... | 343/788 |
| 5,914,640 A | 6/1999 | Nasserbakht | ................ | 330/294 |
| 5,929,813 A | 7/1999 | Eggleston | .................... | 343/700 |
| 6,018,299 A | 1/2000 | Eberhardt | ................. | 340/572.7 |
| 6,023,244 A | 2/2000 | Snygg et al. | ............... | 343/700 |
| 6,385,407 B1 * | 5/2002 | Inose | ........................... | 399/24 |
| 6,538,569 B1 * | 3/2003 | Dunn | ......................... | 340/540 |

FOREIGN PATENT DOCUMENTS

| | | | | |
|---|---|---|---|---|
| DE | 44 46 2-3 A | 6/1996 | ......... | G06K/19/07 |
| WO | WO 99 65002 A | 12/1999 | ........... | G08B/13/14 |

* cited by examiner

Primary Examiner—Hoang Nguyen
(74) Attorney, Agent, or Firm—Withrow & Terranova PLLC

(57) ABSTRACT

A wireless communication device and method for identifying a container, or communication information about a container, using a slot in the container as an antenna. The device includes a wireless communication device for transmitting information regarding the container. The container includes an outer wall forming a rim and a slot between the rim edge and the outer wall that is circular and continues without boundaries. The wireless communication device is coupled to the slot to provide the slot antenna for communications. An impedance matching network is additionally provided to make the operating frequency of the slot substantially the same as the operating frequency of the wireless communication device. Alternatively, shorting posts may be placed in the slot to define boundaries of the slot to match the operating frequency of the slot to the operating frequency of the antenna. Variable impedance matching is provided between the wireless communication device and the slot.

28 Claims, 19 Drawing Sheets

TUNING TECHNIQUES FOR A SLOT ANTENNA

RELATED APPLICATIONS

The present application is a continuation-in-part of co-pending application Ser. No. 09/536,334 filed Mar. 25, 2000, entitled "Remote communication using slot antenna".

FIELD OF THE INVENTION

The present invention relates generally to a device and method for identifying a container and, more particularly, to a device and method for using the slot of the container as an antenna for remote communications.

BACKGROUND OF THE INVENTION

It is often necessary to monitor the location and movement of materials within a distribution center or manufacturing facility. One method of tracking the materials is to attach a wireless communication device, such as a radio frequency identification (RFID) transponder or other identification device, to containers that are housing the materials. By way of example, a liquid container, such as a barrel or keg, may include an identification device indicative of the liquid contained inside. A transmission device, such as an interrogation reader or transmitter, having an antenna device, is able to send information remotely through electronic signals. Such transmission device is placed throughout the distribution or manufacturing facility to receive signals transmitted from wireless communication devices. The signals are then passed to a central control system that monitors and records the applicable information. The central control system can also send information to its interrogation readers to send to the transponders for response and/or to be stored in the transponder's memory.

The information communicated by the containers in the system to the interrogation readers may be used for a number of reasons. For example, a statistical analysis may be made of the materials to maintain accurate inventories, production flow rates, and other production standards. Additionally, the identification devices may include specific information about the materials housed within the containers, including date of manufacture, place of manufacture, type of product within the container, temperature of the container and ambient air, temperature of the contents of the container, and pressure of the container, etc.

The wireless communication device must have an antenna arrangement to communicate information about the containers to the interrogation readers. It is generally known for wireless communication devices to include an antenna. It is often a problem for many wireless communication devices to provide an antenna, especially if the wireless communication device is small or is required to be placed in a contained area. The length of the antenna must be tailored to the specific frequency at which the wireless communication device is designed to operate. For low frequencies in the MHz range or lower, an antenna may have to be several inches long to several feet long. The antenna may have to be several inches long for higher frequencies, to allow successful communication at the desired operating frequency.

Additionally, the antenna must either be packaged inside the wireless communication packaging that houses the wireless communication device, or located external to the wireless communication device. External positioning of the antenna to the wireless communication device provides several other challenges when placing the wireless communication device in a confined area, such as in a container. The antenna may have additional problems radiating energy effectively if the antenna is contained internal to a device, such as a container.

Some containers have a natural slot as a characteristic of their manufacture. A slot may be formed by edges of a conductive material coming together in close proximity forming a gap of air between the edges. A slot may also be formed by cutting out or removing material from a conductive surface to form an open or hollow area of free space or air. A slot could be formed by a curl of a cylinder or other surface to form a rim, whereby a slot is created by the gap between the end of the curl and the surface.

For example, a beer keg is made out of a metal material that has an outer wall with a curled end to form a rim. The keg rim is used for handling and movement of the keg. The curled portion of the rim bends inward towards the outer wall, leaving a small gap between the edge of the rim and outer wall. This small gap forms a slot that extends circularly around the keg, and can be used to provide a slot antenna for the wireless communication device. The wireless communication device can be designed to provide electronic connectivity to the slot when installed, so that the slot can be used to provide the effect of an antenna. Since the slot of the container may be several feet long, using the slot for the antenna may be advantageous for communication at lower frequencies where providing an antenna of sufficient length for communication at the desired frequency is problematic.

Therefore, it is advantageous to use the slot of a container to provide an effective antenna for a wireless communication device. One drawback of using the slot of a container to provide an effective antenna is that the impedance of the slot antenna should be matched to the impedance of the communications electronics, which is typically 50 Ω. While this is not a problem to provide in a static environment, the impedance of the slot antenna may change as a function of its environment. Specifically, the temperature or atmospheric conditions may affect the size and shape of the slot as the material forming the slot changes shape in response to the changes in the atmospheric conditions or temperature. Further, as these containers may be subjected to robust physical conditions, the shape of the slot may be deformed by dents or other imperfections introduced to the container by handling. Thus, there remains a need for a technique to allow impedance matching in the face of the changing impedance of the slot antenna.

SUMMARY OF THE INVENTION

The present invention includes a wireless communication device using a slot antenna arrangement formed by the slot of a container. A wireless communication device is provided with the container to provide information about the identification or other aspects of the container as it moves through manufacturing, tracking or shipping facilities.

An antenna is provided for the wireless communication device so that it can communicate remotely with a transmitter/receiver. One embodiment of the present invention includes an interrogation reader as the transmitter/receiver. The present invention capitalizes on the phenomenon that exists whereby a slot in a conductive material, such as metal, aluminum, copper, or iron for instance, can be coupled to a wireless communication device's communications electronics to provide the effect of a pole antenna.

Some containers have, by the nature of their construction, a slot that can be used as a slot antenna. Alternatively, a slot can also be cut out of the container. Using a slot antenna, instead of a pole antenna, provides several advantages. The length of the slot necessary for the wireless communication device to operate at the desired frequency may be more suitable than could be provided by using a pole antenna. This is especially true for lower frequency communications that require longer length antennas. Additionally, the slot does not require that a pole device be placed inside or proximate to the container. Using the slot may also be less expensive than using a pole antenna. Additionally, a pole antenna may extend from the container, exposing it to damage.

In one embodiment, the wireless communication device uses feed lines directly connected to the each edge of the slot.

In another embodiment, the wireless communication device includes feed lines that reactively couple with each edge of the slot.

In another embodiment, a conductive device is placed between the slot to couple the wireless communication device to the slot to provide the slot antenna.

In another embodiment, the wireless communication device is mounted on a nonconductive substrate in the slot. A feed line from the wireless communication device rests on the substrate, such that the feed line reactively couples with the slot to provide the slot antenna.

The operating frequency of the slot is substantially matched to the operating frequency of the wireless communication device to maximize the slot antenna radiation efficiency. A circuit is provided between the slot and the wireless communication device to match the impedance of the slot to the impedance of the wireless communication device.

In an alternative embodiment, shorting posts are provided on the ends of the slot to create a slot with the desired length. The shorting posts are constructed out of a conductive material, such as metal, aluminum, copper or iron for example, and are placed between the slot's edges to short both sides of the slot together. Examples of conductive materials include, but are not limited to, metal, aluminum, copper, and iron.

Variable impedance matching is provided between the wireless communication device and the slot. The variable impedance matching may take a number of different forms, but four variable impedance matching device embodiments are disclosed herein. The first embodiment comprises placing an approximately V-shaped clip that acts as a variable capacitor in the slot. In particular, as the distance between the arms of the clip closes in response to changes in the shape of the slot, the capacitance increases.

A second variable impedance matching embodiment decreases capacitance as the width of the slot decreases. This is accomplished by placing two parallel plates proximate to one another and perpendicular to the longitudinal axis of the slot. The two plates act as a capacitor. As the shape of the slot changes, the plates move from a first position, substantially overlapping, to a non-overlapping second position. This movement reduces the capacitance between the plates.

A third variable impedance matching embodiment increases the inductance as the width of the slot decreases. This is accomplished by placing a helical coil parallel to the lateral axis of the slot. As the slot compresses, the coil compresses such that the inductance increases.

A fourth variable impedance matching embodiment flips the coil such that it is perpendicular to both the lateral and longitudinal axes of the slot. As the width of the slot decreases, the inductance of the coil decreases.

These embodiments allow for a number of different variations to be made so that impedance matching may be effectuated as needed.

The invention also includes a method of monitoring the container. While the container is within a facility, such as during manufacturing, filling, or storing, the container is moved through at least one interrogation point containing an interrogation reader. Communication between the wireless communication device and the interrogation reader is established for monitoring the location and/or content information about the container. A central control system may be in communication with the interrogation point for monitoring the movement of the container. The central control system may monitor the position of the container, or it may monitor specific information that is stored within memory in the device, or both.

DETAILED DESCRIPTION OF THE INVENTION

Figure 1:
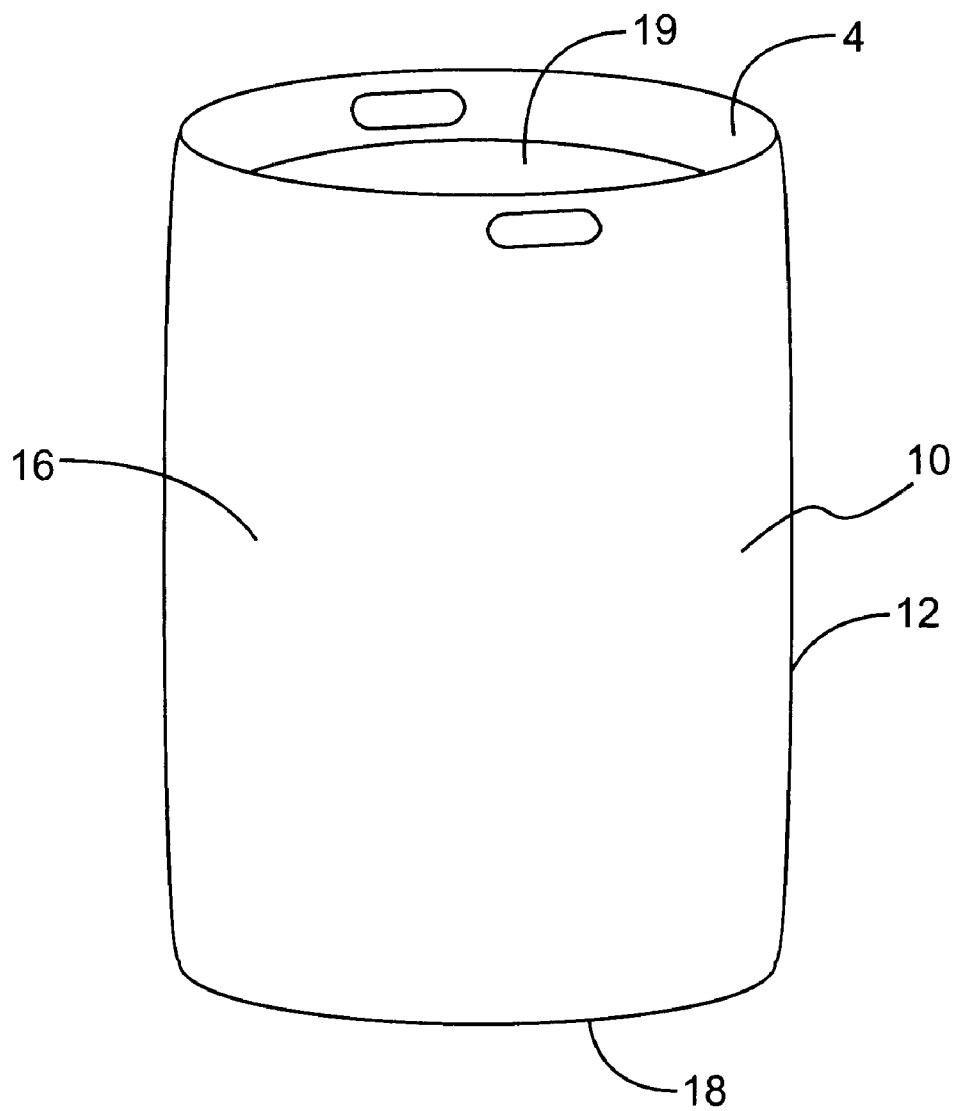
FIG. 1 is a perspective view of one type of container, known as a keg, constructed in accordance with the present invention.
Figure 2:
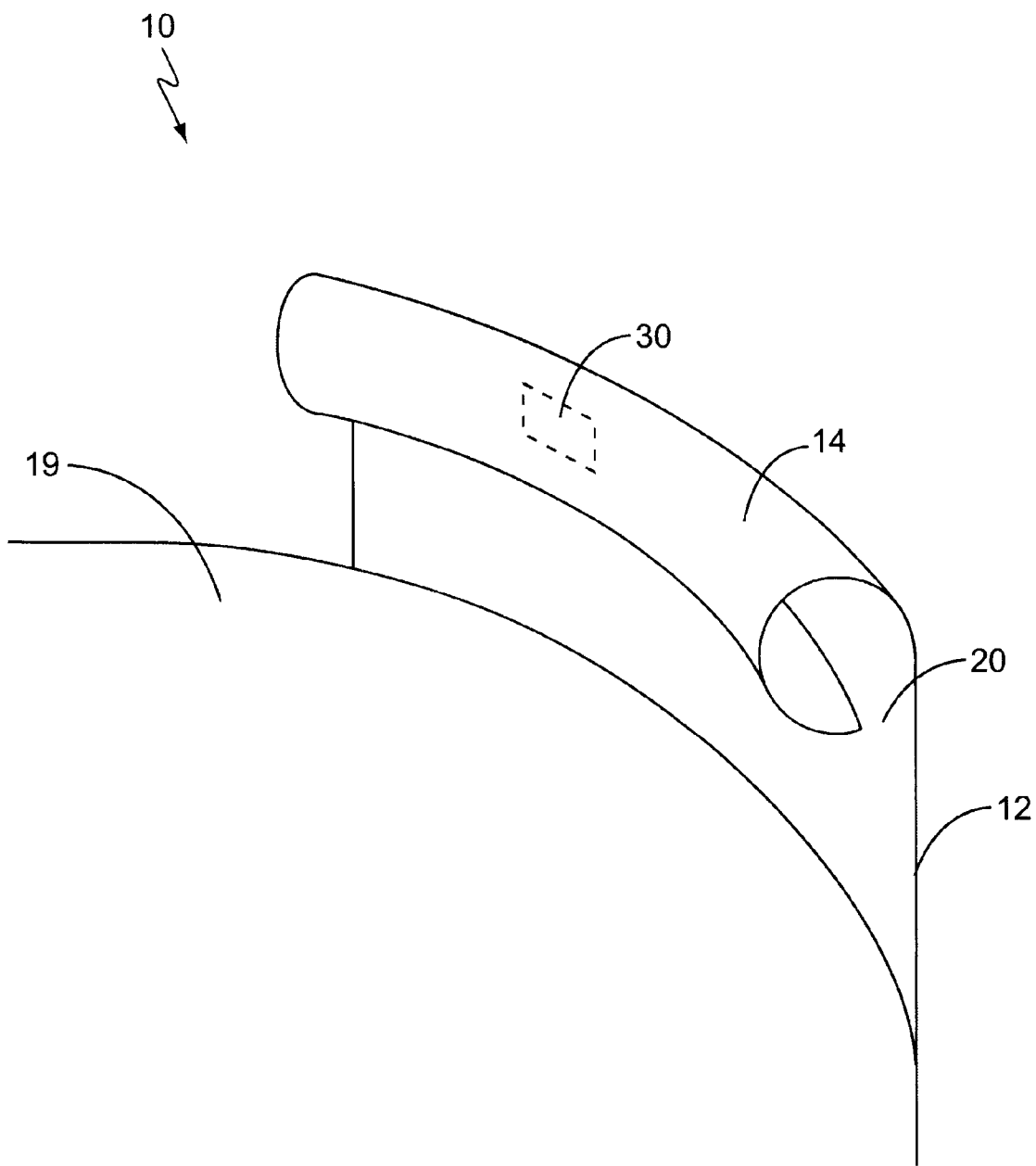
FIG. 2 is a cross sectional side view of the slot in the container.

The present invention is directed to a device and method of using a slot in a container as an antenna for a wireless communication device. As illustrated in FIGS. 1 and 2, the invention includes a wireless identification device 30, called a "transponder," that is mounted in a container 10 for identifying the container 10. The container 10 has outer walls 12, including a bottom wall 18, a top wall 19, and outer walls 12 sealed together forming an enclosed chamber for housing a material 16. A rim 14 is formed by the outer wall 12 and may extend above the top wall 19 and the bottom wall 18, for handling the container 10. The outer wall 12 extends upward and curls inward to form the rim 14. The gap between the end of the curled outer wall and the outer wall 12 is called the slot 20 that extends around the circumference of the container 10. A transponder 30 is provided within the rim 14. The transponder 30 may contain information about the container 10 that is communicated to at least one interrogation reader. It should be readily understood to one of ordinary skill in the art that the present invention is not limited to the particular container 10 illustrated in FIGS. 1 and 2, and that the present invention is applicable to other types of containers having a slot 20.

Figure 3:
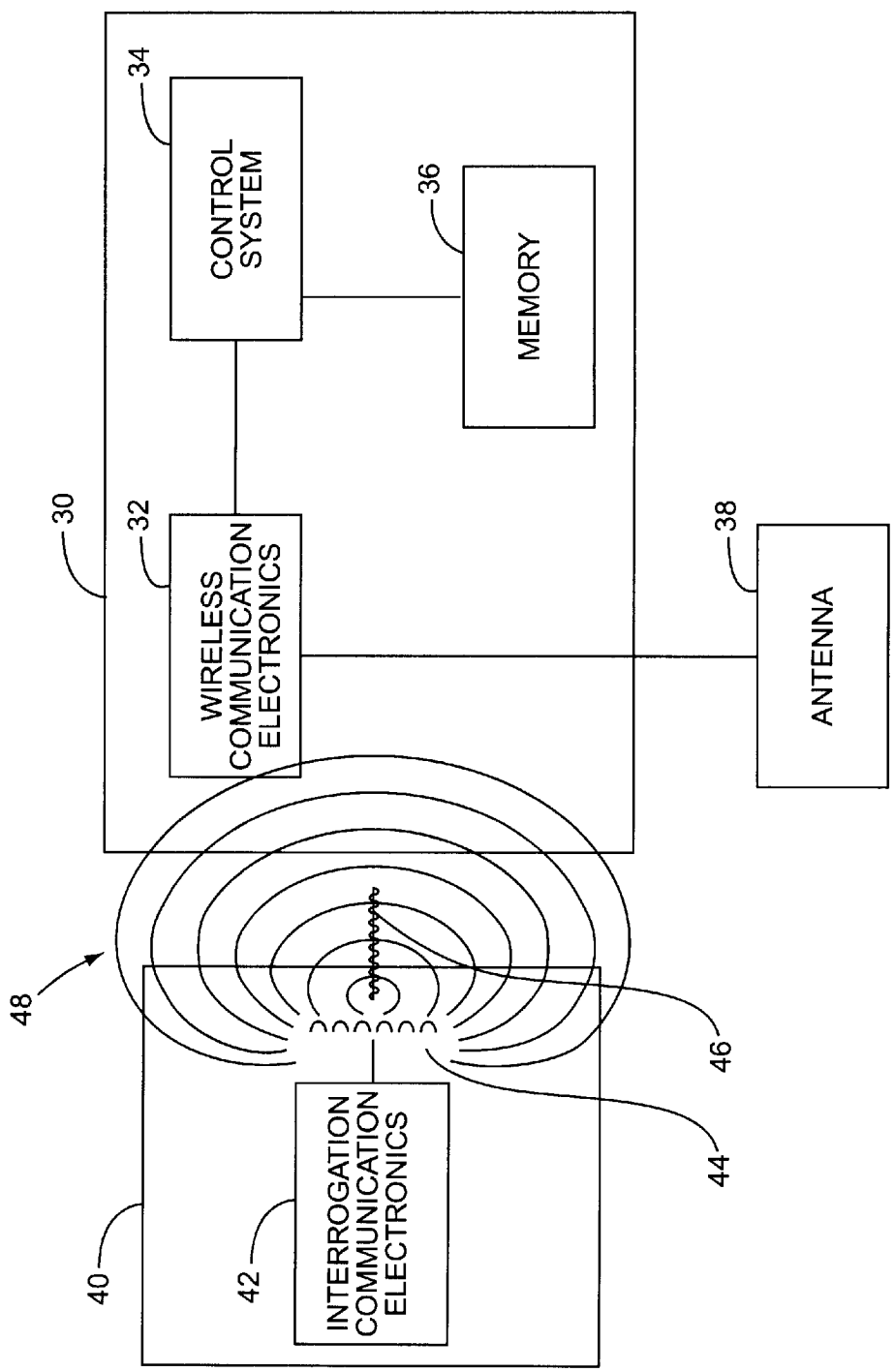
FIG. 3 is a schematic diagram illustrating communication between the transponder and an interrogation reader.

FIG. 3 illustrates one particular type of wireless communication device 30 called a radio frequency transponder 30. This application uses a transponder 30 to describe the present invention, but transponder 30 and wireless communication device 30 are equivalent devices that can be used interchangeably with the present invention. It should be readily understood to one of ordinary skill in the art that there are many other different types of wireless communication devices that allow electronic communication. The present invention is not limited to any one particular type of wireless communication device 30, including a transponder 30.

The transponder 30 includes a control system 34 and wireless communication electronics 32. The transponder 30 may also contain local memory 36 for storage of information to be communicated to an interrogation reader 40. Alternatively, the transponder 30 may store information, such as an identification number or indicia, by using diodes, a dip switch or some other like circuitry. However, the present invention is not limited to transponders 30 that contain memory 36. An antenna 38 is also provided for communication and may be either external to or incorporated internal to the packaging of the transponder 30. The packaging may be constructed out of a plastic or other epoxy material, such that the transponder 30 is protected for the environment. The particular type and location of the antenna 38 will depend on the operating frequency of the transponder 30 and the particular design desired.

The control system 34 is an integrated circuit or other type of microprocessor or micro-controller electronics that controls the substantive operations of the transponder 30. The control system 34 is connected to the wireless communication electronics 32 to communicate and receive transmissions. The control system 34 is also connected to memory 36 for storing and retrieving information. The control system 34 may further include a clock.

FIG. 3 also depicts how communication is achieved with the transponder 30. An interrogation reader 40 contains interrogation communication electronics 42 and an interrogation antenna 44. The interrogation reader 40 communicates to the transponder 30 by emitting an electronic signal or command 46 modulated in a frequency through the interrogation antenna 44. The interrogation antenna 44 may be any type of antenna that can radiate the modulated signal 46 through a field 48 so that a compatible device, such as the transponder 30, can receive such signal 46 through its own antenna 38. The field 48 could be any of a variety of different types used in electronic communications, including electromagnetic, magnetic, or electric. The signal 46 is a message containing information and/or specific instructions for the transponder 30.

When the transponder antenna 38 is in the presence of the field 48 emitted by the interrogation reader antenna 44, the wireless communication electronics 32 are energized, thereby energizing the transponder 30. The transponder 30 remains energized so long as its antenna 38 is in the field 48 of the interrogation reader 40. The wireless communication electronics 32 demodulates the signal 46 and send the message containing information and/or specific instructions to the control system 34 for appropriate actions. For example, the request in the message may be for the transponder 30 to communicate its identification information about the container 10 or the materials 16 housed within the container 10, including, but not limited to, date of manufacture, place of manufacture, and type of product within the container 10. The message may also be instructions to communicate information regarding the environmental information, such as temperature of the container 10, or pressure levels. The transponder 30 communicates information requested to the interrogation reader 40 by altering the contents of the signal 46 for whatever type of information is requested.

Alternative forms exist for communicating with a transponder 30, or other wireless communication device. For instance, the transponder 30 may have a transmitter that can send information to the interrogation reader 40 without having to alter the content of the signal 46. The transponder 30 may contain its own power source, such as a battery, or other energy storage unit charged when the transponder 30 is in the field 48, to power the transmitter. It is understood to one of ordinary skill in the art that there are many other manners in which to communicate with a wireless communication device, such as a transponder 30, and that the present invention is not limited to the particular manner described above.

FIGS. 4A–4D show various configurations of slot antenna arrangements to provide an antenna 38 by using the slot 20 in the container 10 as previously described. A slot 20 can provide a slot antenna 38 to the transponder 30 by coupling the transponder to the slot 20. More information on slot antennas 38 and their operation is described in U.S. Pat. No. 4,975,711, entitled "Slot antenna device for portable radiophone," incorporated hereby by reference in its entirety.

Voltage signals are provided by the transponder 30 to opposites sides of the slot 20. In the beer keg container 10 embodiment, one side of the slot 20 is formed by the outer wall 12, and the other side of the slot 20 is formed by the rim edge 52. When the voltage signals are applied across the slot 20, the slot 20 radiates electromagnetic waves similar to the manner in which a pole antenna arrangement would radiate to effectuate communications.

Figure 4A:
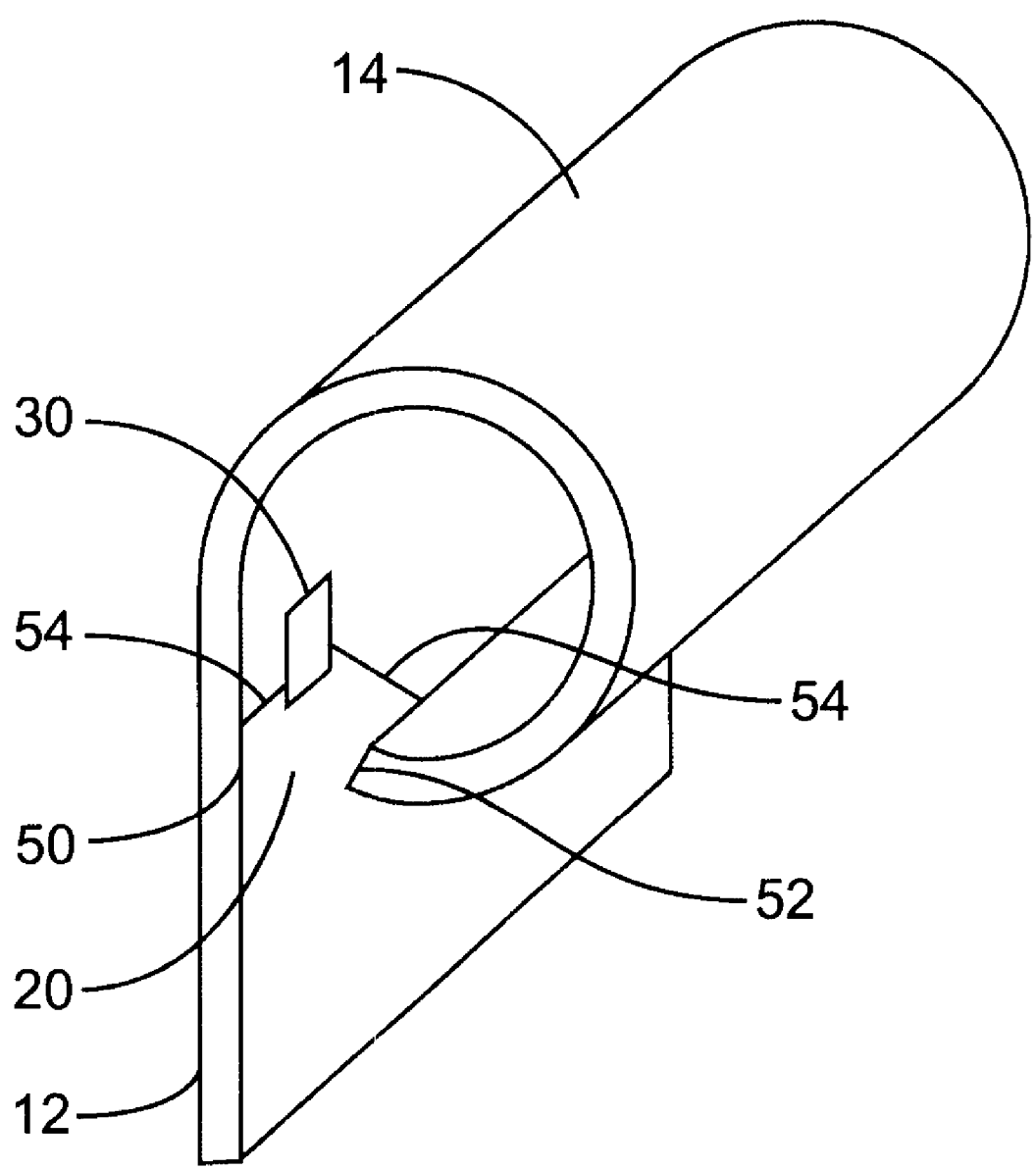
FIG. 4A is a schematic view of the slot antenna using direct feed lines.

FIG. 4A illustrates a close-up view of the outer wall 12 and the rim 14, illustrating how the transponder 30 couples to the slot 20 using feed lines 54 to form a slot antenna 38. The transponder 30 is located in the inner portion of the rim 14. The slot 20 is formed by the gap between the outer wall edge 50 and the rim edge 52 that extends around the entire circumference of the container 10. Feed lines 54 are connected to the outer wall edge 50 and the rim edge 52 to provide an electrical connection between the transponder 30, particularly the wireless communication electronics 32, and the slot 20.

Figure 4B:
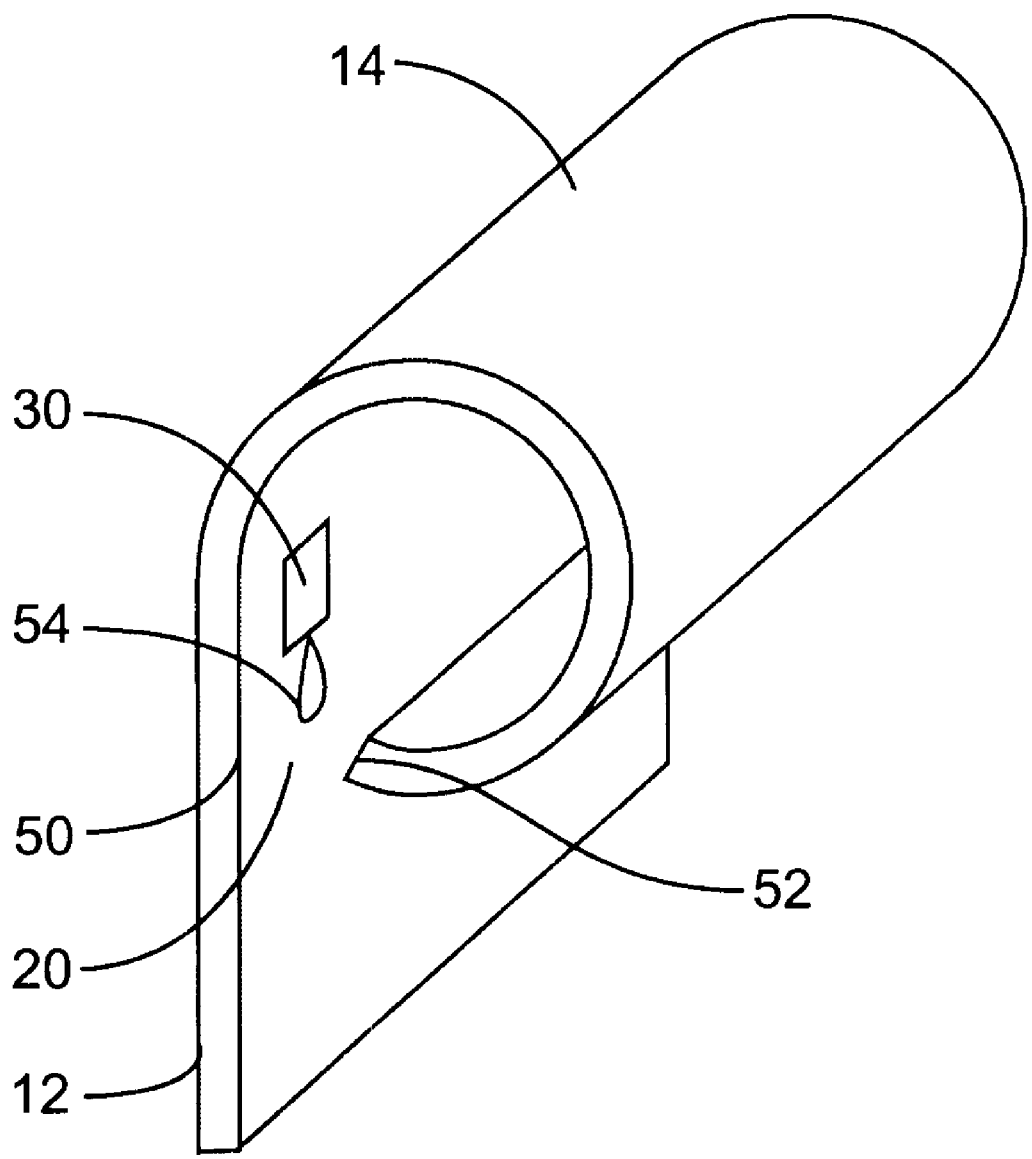
FIG. 4B is a schematic view of the slot antenna using reactive feed lines.

FIG. 4B illustrates an embodiment whereby the feed line 54 does not directly connect to the outer wall edge 50 or the rim edge 52. Instead, the feed line 54 is placed in close proximity to the outer wall edge 50 or the rim edge 52 to reactively couple to the slot 20. The feed line 54 is still excited without direct contact between the feed line 54 and the slot 20, due to its close proximity to the slot 20.

Figure 4C:
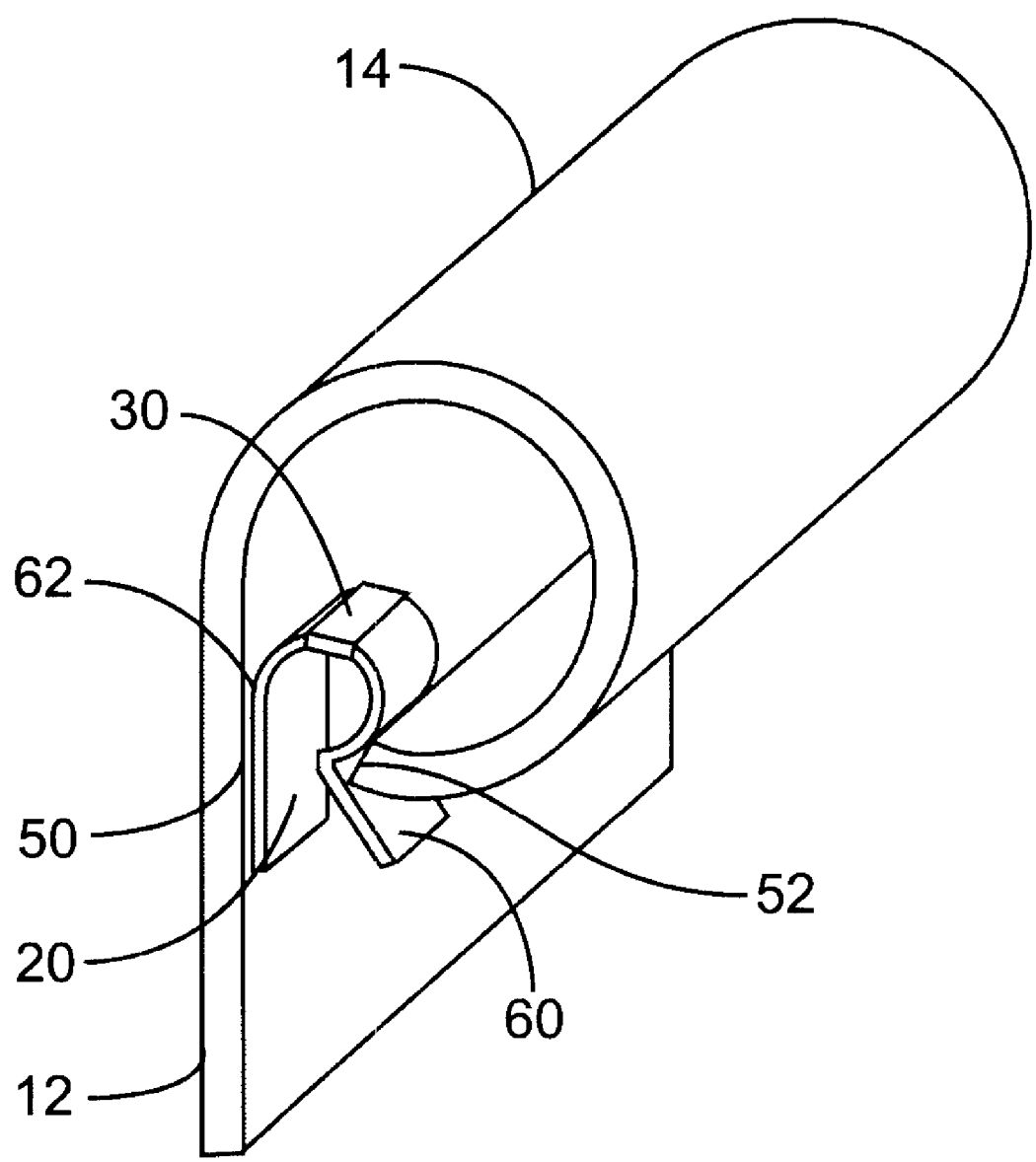
FIG. 4C is a schematic view of the slot antenna using a transponder mounting device as feed lines.

FIG. 4C illustrates an embodiment whereby a mounting device containing the transponder 30 is placed in the slot 20 to form the slot antenna 38, sometimes referred to as a conductive clip 60. A conductive clip 60, as used herein, is a device constructed out of a conductive material, such as metal, aluminum, copper, or iron for example. The conductive clip 60 keeps its form in a resilient manner, and can be inserted into a gap or space in a secure manner. The conductive clip 60 provides both a mounting technique for the transponder 30 and a connection between the wireless communication electronics 32 and the slot 20, to provide the slot antenna 38. The conductive clip 60 is substantially in the shape of an "R"; however, other types of clips with the same characteristics as described herein, may also be used. The transponder 30 is mounted to the top of the conductive clip 60. The conductive clip 60 is inserted with the round portion inside the slot 20 to provide a secure fit between the outer wall 12 and the rim edge 52. The portion of the conductive clip 60 contacting the outer wall 12 provides a ground plane 62 for the slot antenna 38. The portion of the conductive clip 60 contacting the rim edge 52 provides a connection or feed line 54 to the slot 20 to provide a slot antenna 38 for the transponder 30.

Figure 4D:
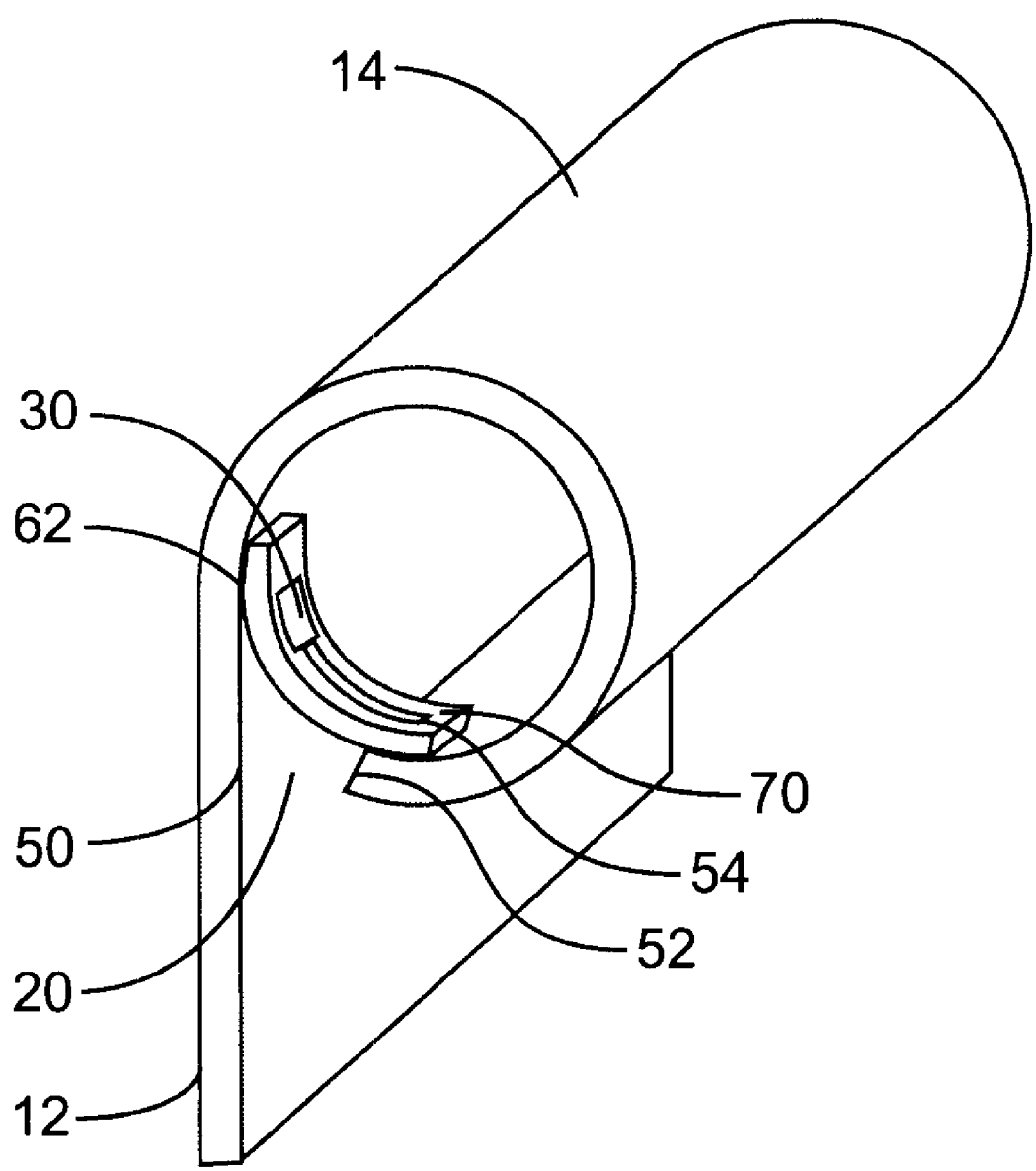
FIG. 4D is a schematic view of the slot antenna using feed lines on a no-conductive substrate to couple to the slot.

FIG. 4D shows another alternative arrangement whereby the transponder 30 is mounted to a substrate material 70. The substrate material 70 is a dielectric material. The substrate material 70 is curled and placed inside the rim 14. One side of the substrate material 70 contacts the outer wall 12, and the other side of the substrate material 70 contacts the rim edge 52. The transponder 30 has a feed line 54 that extends from the wireless communication electronics 32 and rests on the substrate material 70, extending downward proximate to the rim edge 52. The transponder 30, located proximate to the outer wall 12, provides coupling to the outer wall creating a ground plane 62 with earth. The feed line 54 extends to the rim edge 52 and is coupled with the rim edge 52, either as an open circuit or a short circuit, to provide the optimum coupling of the transponder 30 to the slot 20 to create the slot antenna 38, depending on the length of the feed line 54.

Figure 5:
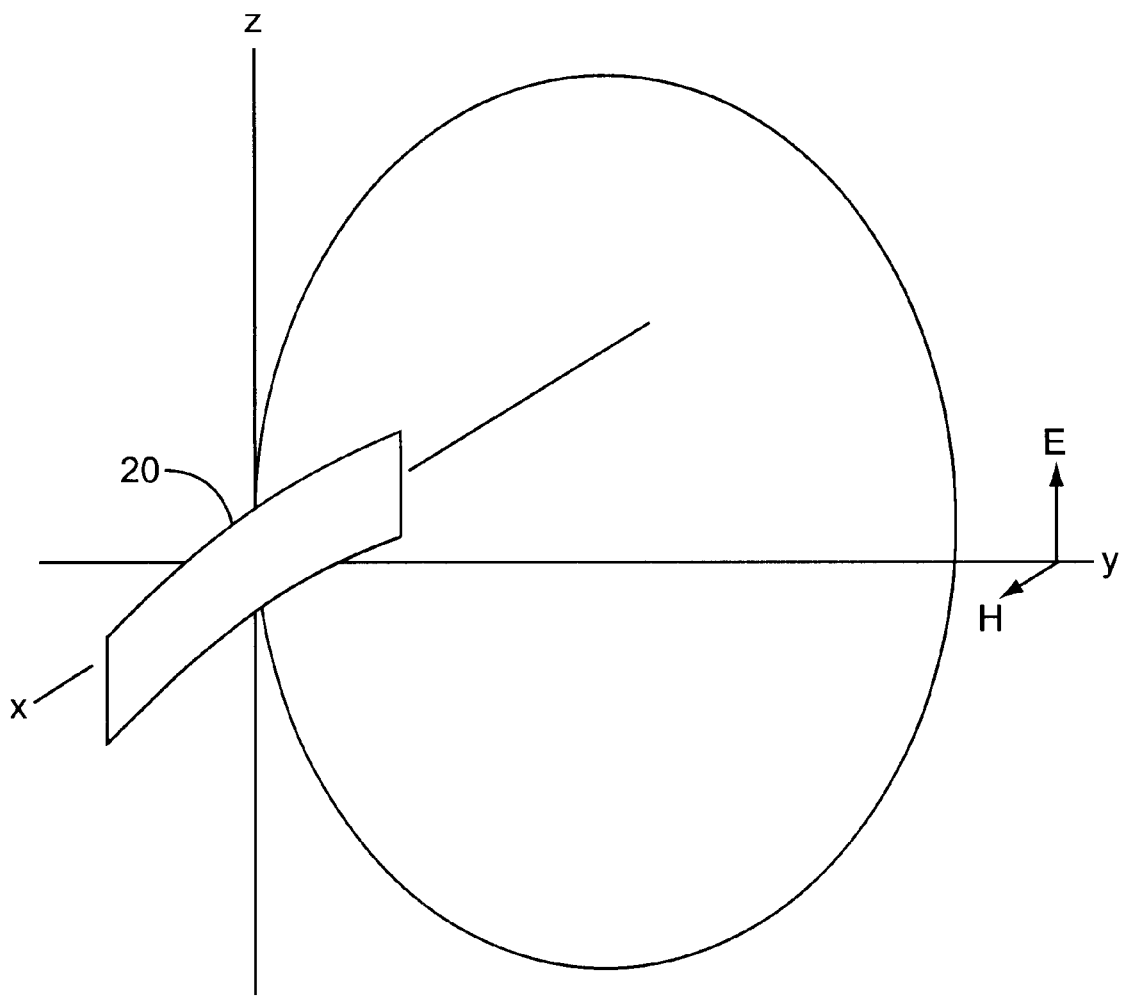
FIG. 5 is a schematic diagram illustrating the radiation pattern of the slot antenna arrangement.

FIG. 5 illustrates the radiation pattern of a slot antenna 38. As illustrated under theoretical conditions, the slot antenna 38 radiation pattern is similar to a pole antenna arrangement, such as a dipole antenna, but the E and H fields are interchanged. The actual radiation pattern of the slot antenna 38 in the present invention is a modified version of this radiation pattern, due to both the curved nature of the slot 20 and the reflection from the surface of the container 10. Therefore, while it is noted that the radiation of the slot antenna 39 may have the characteristics of that illustrated in FIG. 5, such is provided for background purposes only. The present invention is not limited to a slot antenna 38 with such radiation pattern.

Figure 6A:
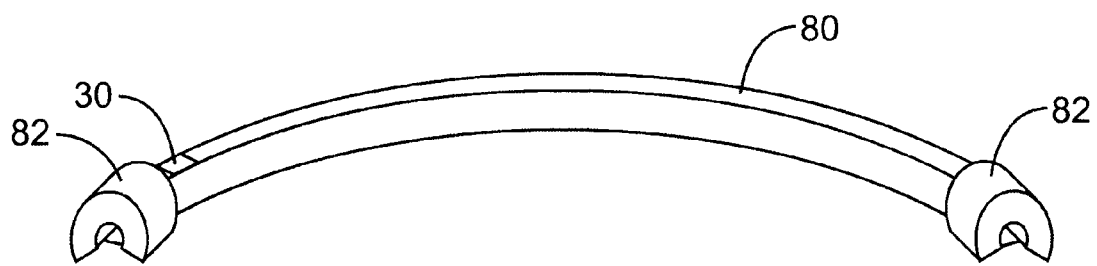
FIG. 6A is a schematic diagram of the slot antenna using shorting posts, with one shorting post proximate to the transponder, to create a monopole like antenna.
Figure 6B:
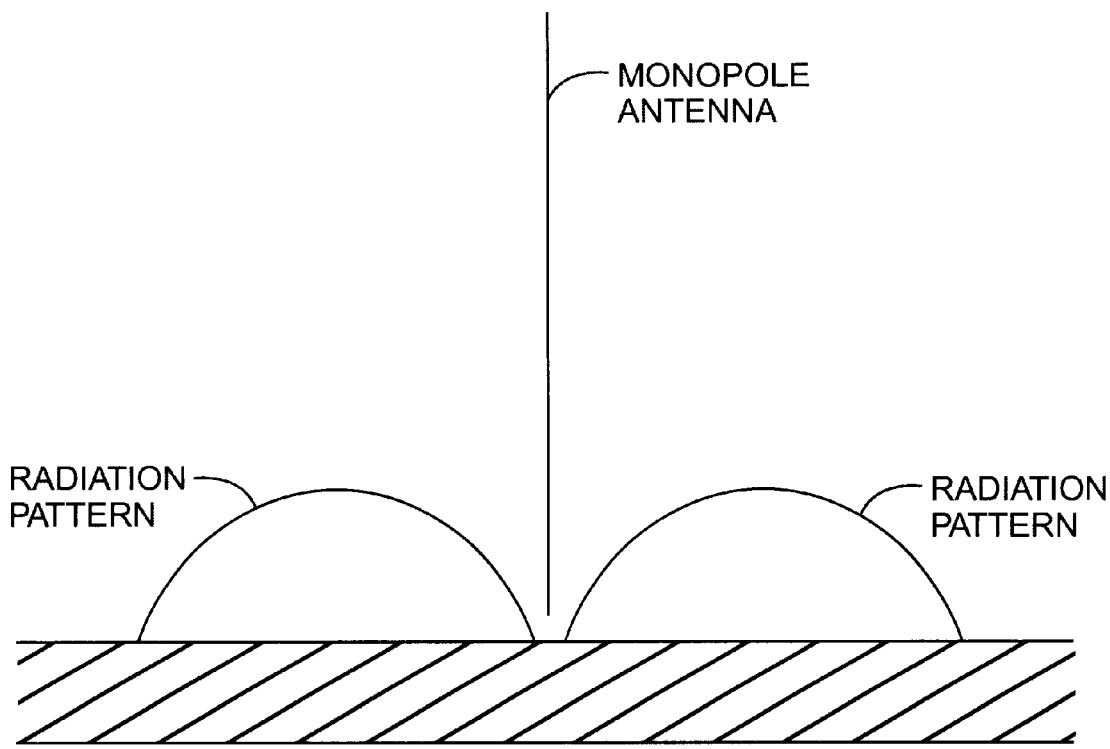
FIG. 6B is a schematic diagram of a typical monopole antenna radiation pattern.
Figure 7A:
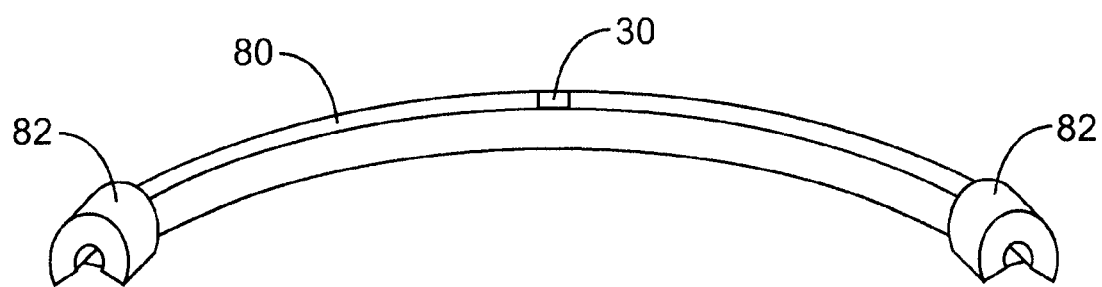
FIG. 7A is a schematic diagram of the slot antenna using shorting posts, with the transponder in between the shorting posts, to create a dipole like antenna.

Container 10 has a continuous slot 20 that extends in a circular path. It may be desired to provide a technique or manner in which to define the length of the slot 20 so that the slot antenna 38 radiates in an improved manner at the operating frequency of the transponder 30. One method of defining the slot 20 length is to provide shorting posts 82 as illustrated in FIGS. 6A and 7A to further improve performance of the slot antenna 38 depending on the frequency. The length of antenna or the slot 20 for a slot antenna 38 is related to the radiation pattern of electronic signals radiated at the desired frequencies. For instance, the length of a dipole antenna is $\lambda$ divided by 2 where $\lambda$ is equal to the speed of light divided by the desired operating frequency. The length of the slot 20 is defined by the boundaries at which there is no longer a gap of space or the placement of conductive material. Some slot antennas 38 are designed in containers 10 or other materials in which the slot 20 is placed at a predefined and desired length. The slot 20 length is defined by providing a conductive material in the slot 20 that shorts one side of the slot 20 to the other side which is the outer wall 12 and the rim edge 52 in one embodiment. Shorting the slot 20 gives a finite length to the slot antenna 38. Shorting posts 82 are placed in the slot 20 at desired locations on each side of the location of transponder 30 coupled to the slot 20 to define the length of the slot 20. An impedance matching network may or may not be necessary with shorting posts 82, depending on if the impedance of the slot 20 and the impedance of the transponder 30 are matched sufficiently in order for the slot antenna 38 to emit a desired radiation pattern.

FIG. 6A illustrates an arrangement where one shorting post 82 is located near or proximate to the transponder 30 and the other shorting post 82 is located a distance away from the transponder 30. The transponder 30 is mounted to a carrier material 80 that is placed inside the rim 14 for mounting the transponder 30 and shorting posts 82. The carrier material 80 is used as a convenient manner in which to mount the transponder 30 and the shorting posts 82 in the rim 14 of the container 10. The carrier material 80 is made out of a non-conductive material so that it does not conduct with the slot 20, i.e. the outer wall 12 or the rim edge 52. The transponder 30 is coupled to the slot 20 to provide slot antenna 38 by techniques of coupling the transponder's 30 wireless communication electronics 32 as previously described above. Coupling the transponder 30 to the slot 20 at or proximate to one of the shorting posts 82 creates a slot antenna 38 similar to a radiation pattern of monopole antenna like that shown in FIG. 5B, but it should be noted that the exact radiation pattern of the slot antenna 38 may be different depending on the frequency of the transponder 30 and the shape and other characteristics of the container 10.

Figure 7B:
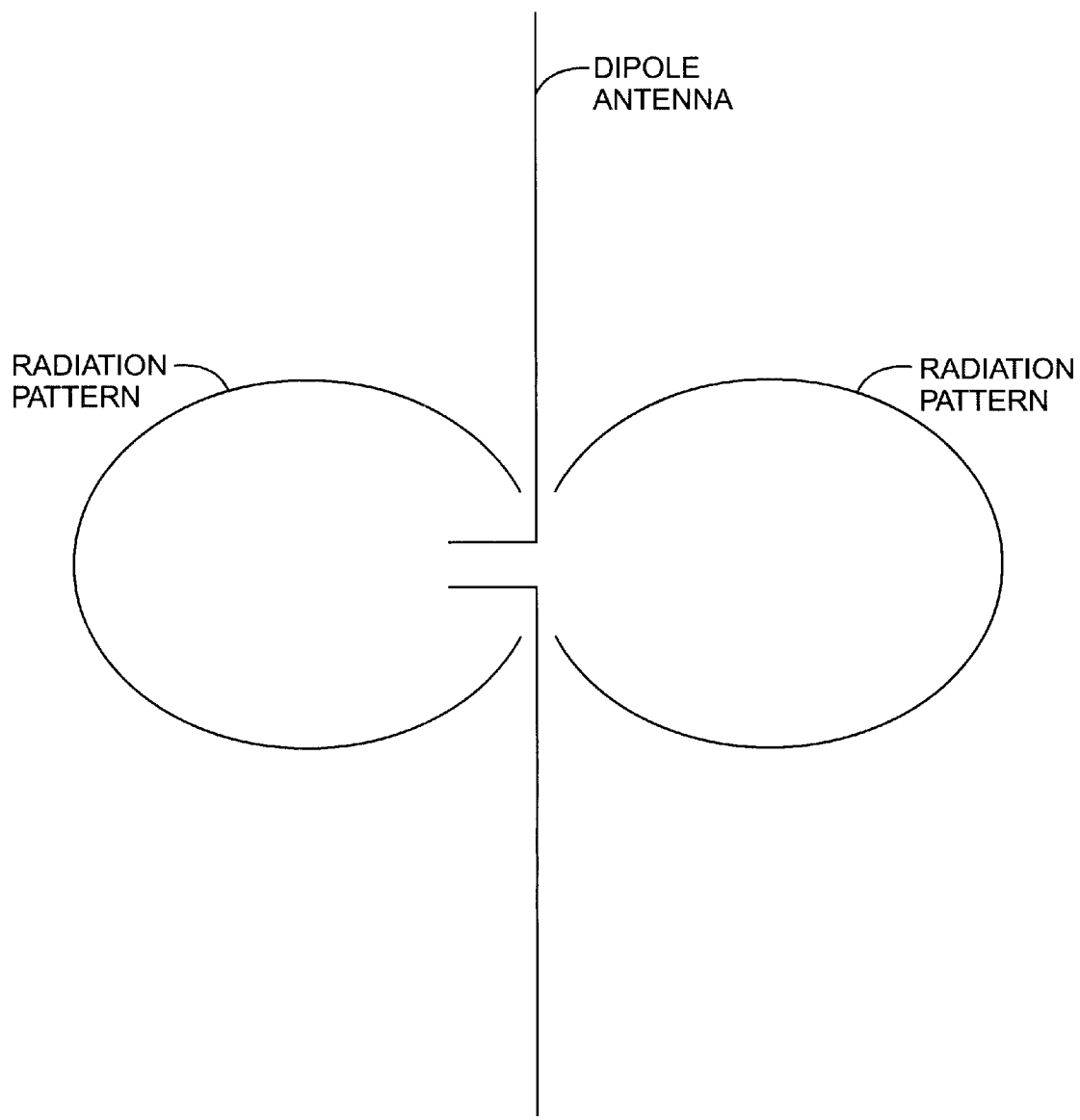
FIG. 7B is a schematic diagram of a typical dipole antenna radiation pattern.

Alternatively as illustrated in FIG. 7A, the transponder 30 and shorting posts 82 are mounted on the carrier material 80 to mount inside the rim 14 of the container 10 similar to FIG. 6A. However, the transponder 30 is coupled to the slot 20 between the two shorting posts 82. Coupling the transponder 30 to the slot 20 in the middle or center of the shorting posts 82 creates a slot antenna 38 similar to a dipole like that shown in FIG. 7B, but it should be noted that the exact radiation pattern of the slot antenna 38 may be different depending on the frequency of the transponder 30 and the shape and other characteristics of the container 10.

When using a slot antenna 38, it is desired for the impedance of the slot 20 to match the impedance of the transponder 30 at the desired frequency to maximize energy transfer from the transponder 30 to the slot antenna 38. Such maximization of energy transfer allows the transponder 30 to emit a maximum radiation pattern. Maximum energy transfer occurs when the impedance of the transponder 30 is the conjugate of the slot 20 impedance. If the transponder 30 has a characteristic impedance that is not the conjugate of the slot 20, a matching network can be provided to do so. An antenna itself can be considered a matching network of sorts, transforming its terminal impedance to 377 ohms, the impedance of free space. However, the impedance of the transponder 30 may not be the same as the slot 20. In this instance, the slot antenna 38 may not perform optimally since the maximum energy transfer would not occur between the transponder 30 and the slot antenna 38.

Figure 8:
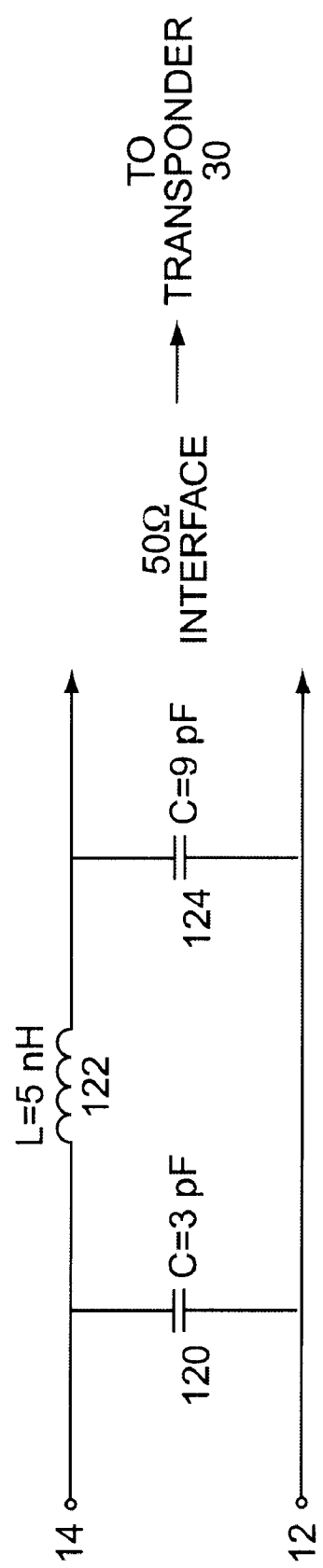
FIG. 8 is a schematic diagram of an impedance matching circuit between the slot antenna and the transponder.

The slot 20 of the present invention has a fairly low impedance. Therefore, it may be necessary to transform the slot 20 impedance into the impedance of transponder 30 to maximum energy transfer and therefore maximize the strength of the radiation pattern emitted by the slot antenna 38. An impedance matching network, as illustrated in FIG. 8, is provided to match the impedance of the slot 20 to the impedance of the transponder 30 to ensure that the slot antenna 38 radiates an efficient radiation pattern for the operating frequency of the transponder 30 with minimal or no reflection. The matching network circuit converts the impedance of the slot 20 to the impedance of the transponder 30 for an operating frequency of 868 MHz. The transponder 30 has an impedance of 50 ohms. The matching network circuit is connected on the rim 14 and the outer wall 12 across the slot 20 in parallel with a capacitor 120 of approximately 3 pF. The capacitor 120 is connected in series to an inductor 122 of approximately 5 nH. Another capacitor 124, of approximately 9 pF, is connected in series on the other side of the inductor 122. The capacitor 124 is connected to the wireless communication electronics 32. It should be noted that the characteristics of containers 10 and slot 20 impedances for desired frequencies may require different matching networks than described herein. The present invention is not limited to the particular impedance matching network illustrated in FIG. 8.

To allow for proper impedance matching between a transponder 30 and a slot 20, that may change shape as a function of environmental conditions or handling, the present invention allows for a variable reactance element to be positioned in conjunction with the slot antenna 38, and more particularly within the impedance matching network between the slot 20 and the transponder 30. The variable reactance element may be a variable capacitor or a variable inductor, and in each case may take at least two aspects. The first aspect increases the reactance of the element as the width of the slot decreases, and the second aspect decreases the reactance of the element as the width of the slot decreases. An embodiment of each is presented in FIGS. 9–12. The particular element chosen to help form the impedance matching network will depend in part on the other elements of the impedance matching network, and also on what reactance is introduced by the changing shape of the slot 20. Thus, if the reactance of the slot 20 increases as the width decreases, a conjugate reactive element must be supplied such that the increase in reactance is canceled.

Figure 9:
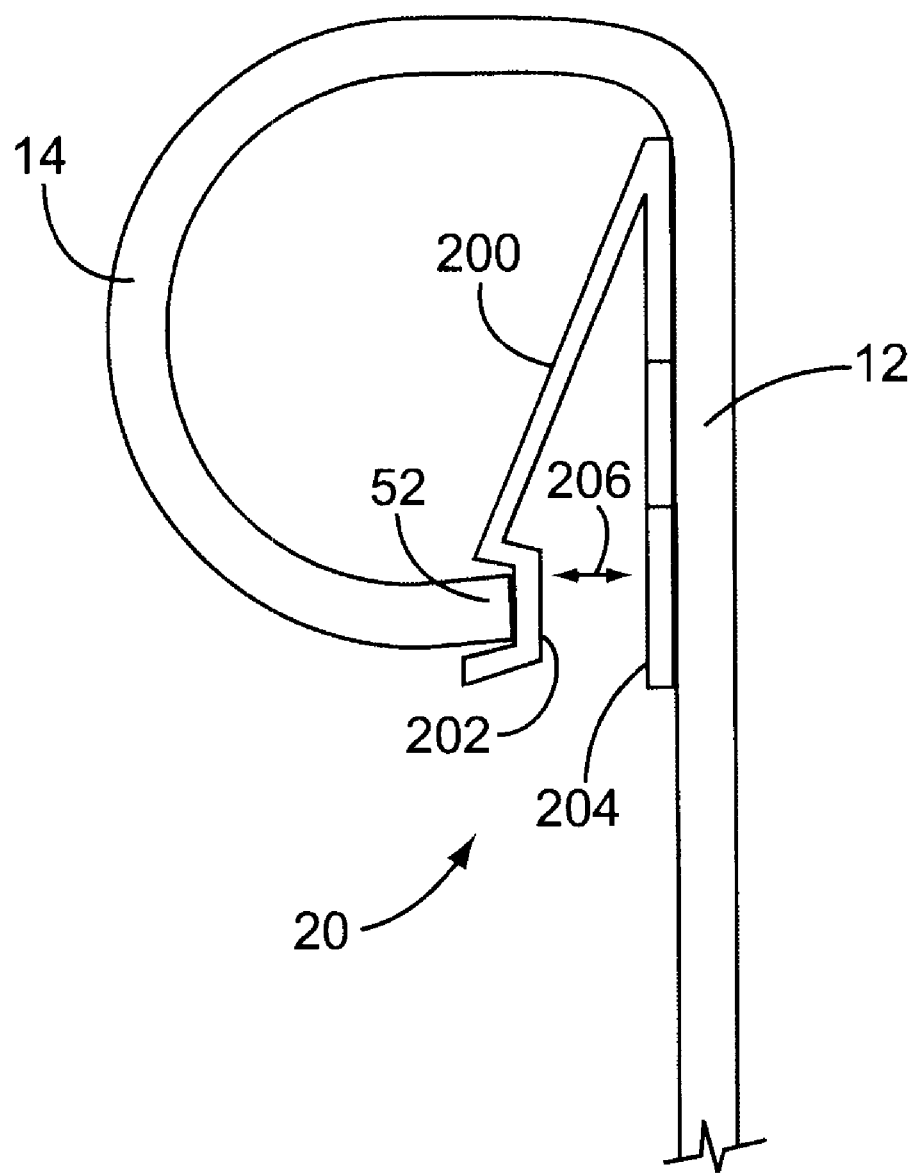
FIG. 9 is a cross-sectional view of a first embodiment of a variable impedance matching device.

A first embodiment comprises a variable capacitor, whose capacitance increases as the width of the slot antenna 38 decreases. In particular, FIG. 9 illustrates a variable capacitor 200 positioned in slot 20. Capacitor 200 may be similarly shaped to the conductive clip 60, or generally V-shaped, and comprises at least two substantially parallel surfaces 202, 204 between which a capacitance is created. As the lateral width (indicated generally by arrow 206) decreases, the distance between surfaces 202, 204 decreases, thereby increasing the capacitance of the capacitor 200. While not shown, it is possible that a high dielectric constant material may be positioned between surfaces 202, 204 to increase the capacitance. Capacitor 200 may be substituted for capacitor 120 or 124 as needed or desired.

Figure 10A:
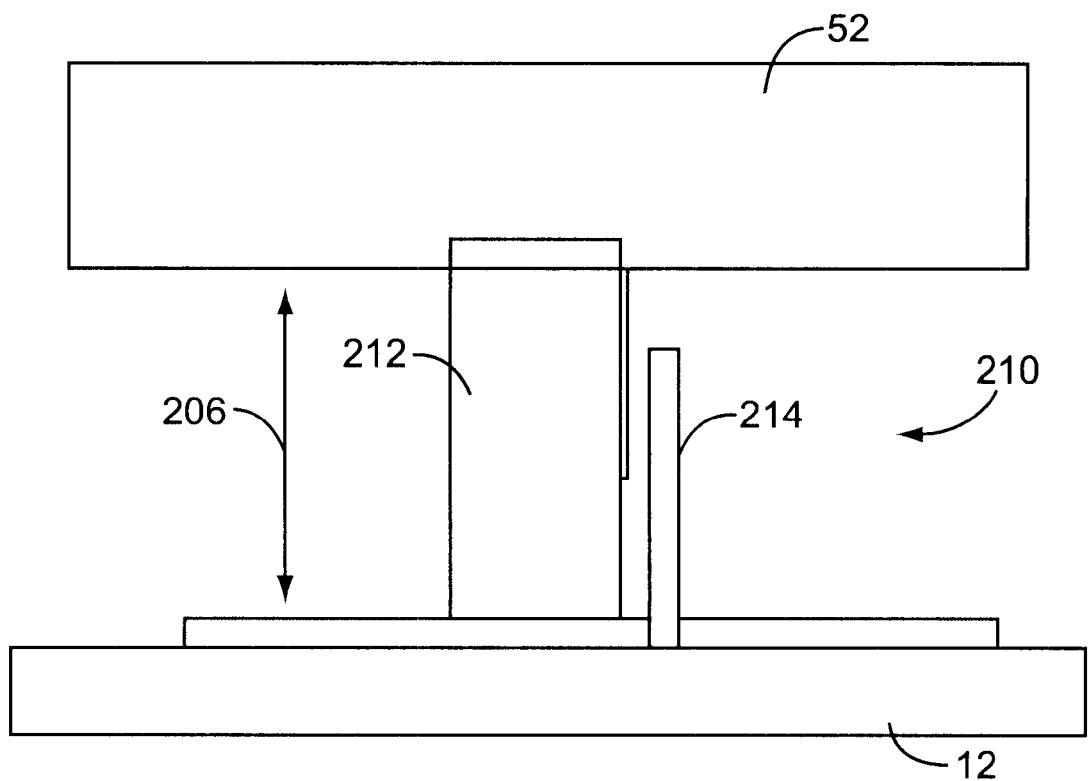
FIGS. 10A and 10B are cross-sectional views of a second embodiment of a variable impedance matching device.
Figure 10B:
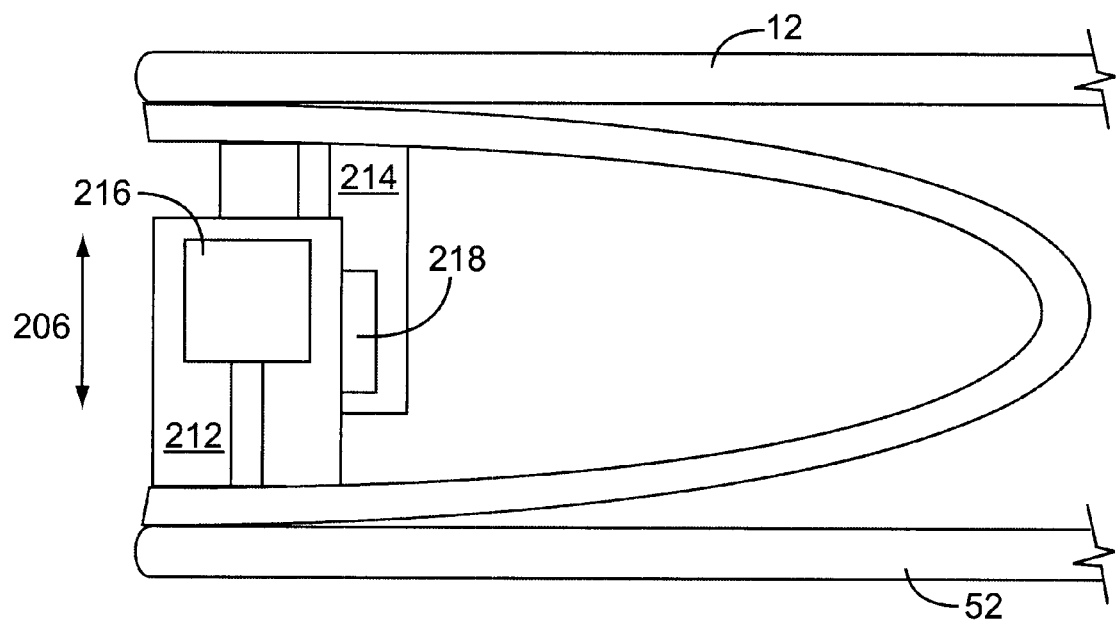

Alternatively, if the capacitance needs to decrease as the width of the slot antenna 38 decreases, a capacitor 210, as illustrated in FIGS. 10A and 10B may be used. Capacitor 210 may again be shaped similarly to conductive clip 60, or generally v-shaped, as previously described, but with flanges 212, 214 projecting therefrom. Flanges 212, 214 support capacitive plates 216, 218 respectively. Capacitive plates 216, 218 form a capacitor there between whose capacitance changes as width 206 changes. When the plates 216, 218 substantially overlap, the capacitance is relatively high. However, as the width 206 decreases, the plates move to a position wherein less area overlaps, thereby reducing the capacitance. The plates 216, 218 are thus perpendicular to an imaginary longitudinal axis of the slot 20. Again, capacitor 210 may be substituted for capacitor 120 or 124 as needed or desired.

Figure 11:
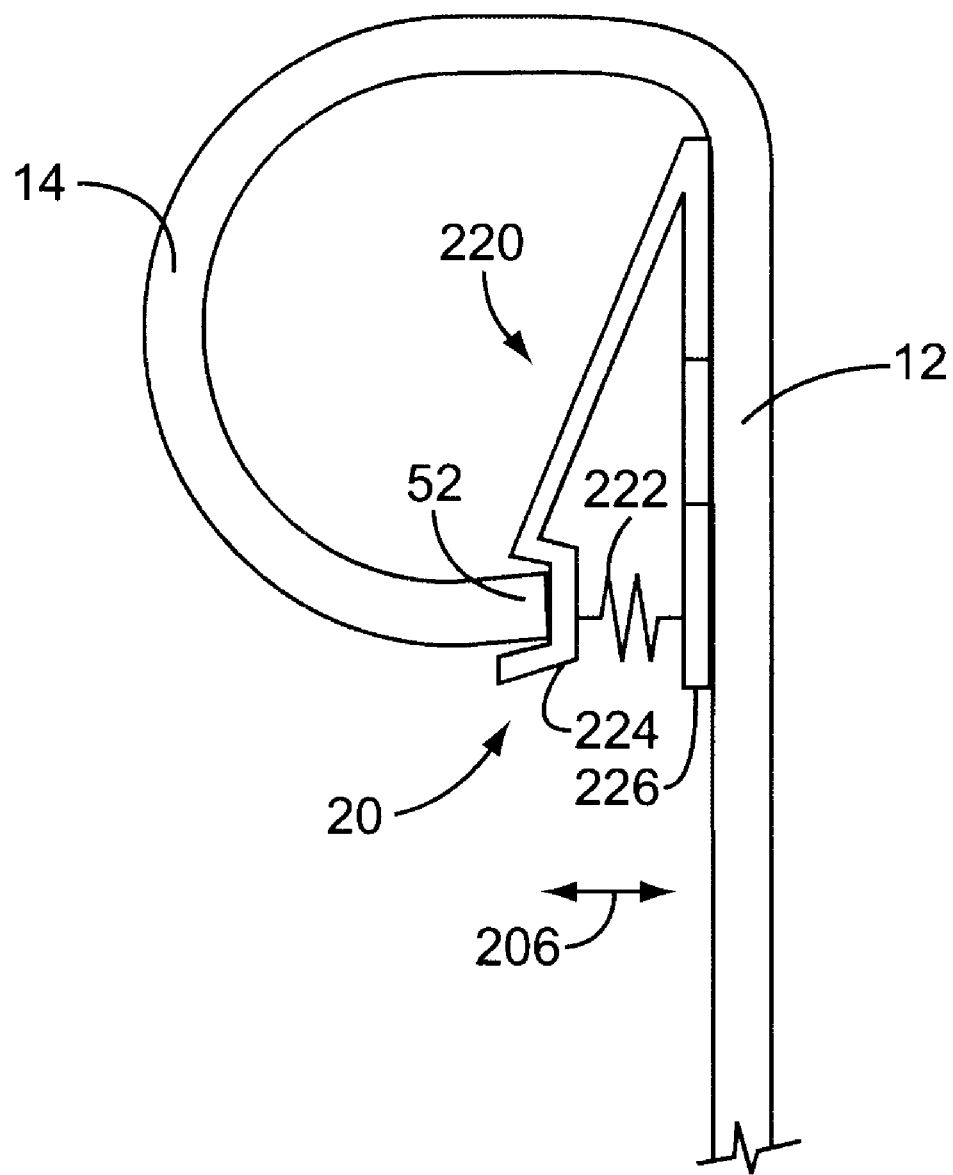
FIG. 11 is a cross-sectional view of a third embodiment of a variable impedance matching device.

A third embodiment, illustrated in FIG. 11, includes a variable inductive unit 220 whose inductance increases as the width 206 decreases. In particular, an inductive coil 222 is positioned with the longitudinal axis of the coil parallel to the lateral axis of the slot 20. As inner surfaces 224 and 226 approach one another as a result of the changing size of slot 20, the loops of the coil 222 are compressed, thereby increasing the inductance of the variable inductive unit 220. Variable inductive unit 220 may be substituted for inductor 122 as needed or desired.

Figure 12:
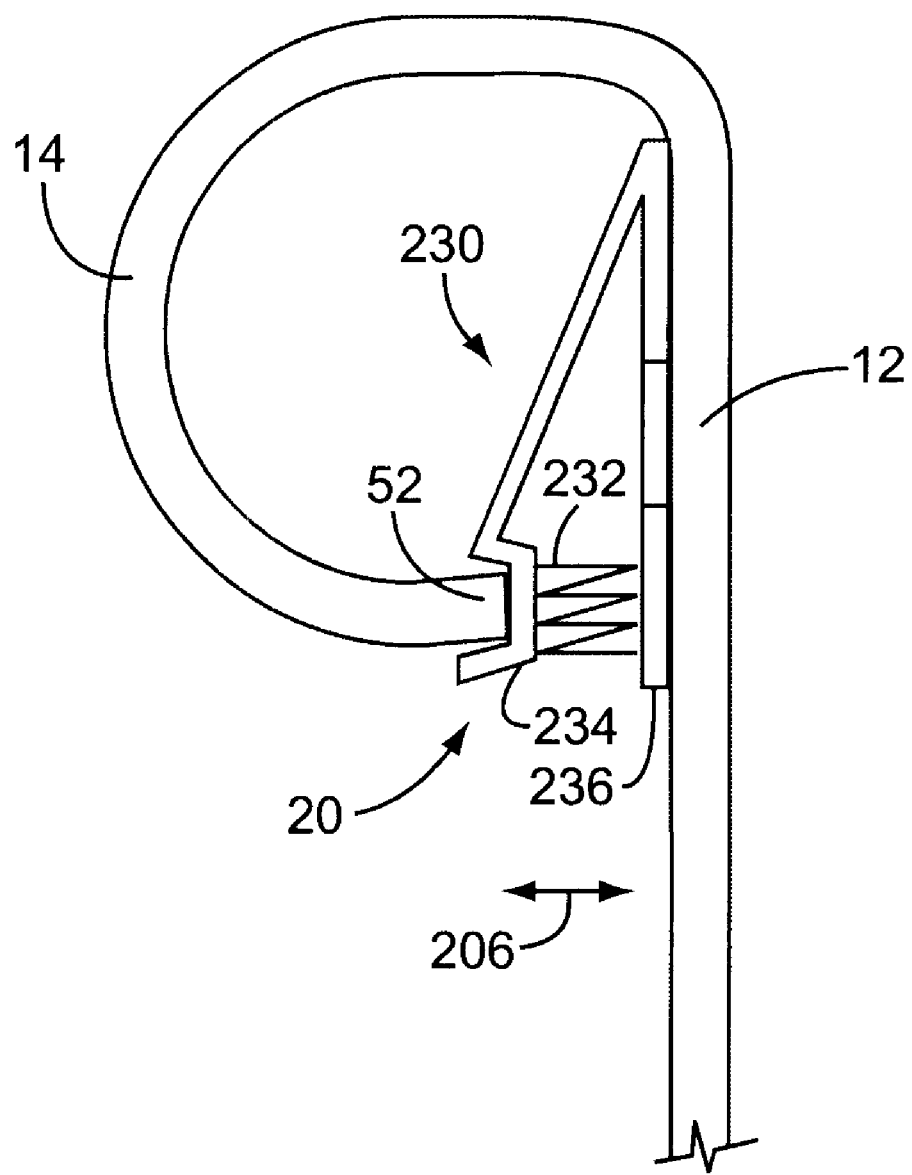
FIG. 12 is a cross-sectional view of a fourth embodiment of a variable impedance matching device.

A fourth embodiment, illustrated in FIG. 12, includes an alternate variable inductive unit 230 whose inductance decreases as the width 206 decreases. In particular, an inductive coil 232 is positioned with the longitudinal axis of the coil perpendicular to the lateral and longitudinal axes of the slot 20. As inner surfaces 234 and 236 approach one another as a result of the changing size of slot 20, the loops of the coil 232 are flattened and spread apart, thereby decreasing the inductance of the variable inductive unit 230. Variable inductive unit 230 may be substituted for inductor 122 as needed or desired.

These four embodiments allow the impedance matching circuit illustrated in FIG. 8 to be adapted to the variable impedance presented by the slot 20. Depending on the other elements, changes in the width may require either increased or decreased capacitance or inductance. Once this is determined empirically, the appropriate element may be substituted as needed or desired.

It should be appreciated that each of these variable reactance elements includes sub-elements. In the case of the capacitors, the sub-elements are the parallel plates. In the case of the inductors, the sub-elements are the loops of the coil.

Note that these variable reactance elements and the associated impedance matching circuit may be integrated into the transponder 30 or merely electrically connected thereto as needed or desired. Another option (not shown) to vary the inductance of a coil is to move a small piece of either ferrite or metal into close proximity to the coil. For example, if a coil were fabricated on the surface of an inserted substrate, moving a ferrite element of suitable characteristics toward the coil would increase the inductance. A piece of aluminum moved similarly will reduce the inductance, at least at VHF and UHF frequencies. High dielectric constant materials may also be used as appropriate, and have the added advantage, at least for doped barium titanate materials, that the change of dielectric constant with temperature can be controlled to give both positive and negative coefficients.

It should further be appreciated that a plurality of reactive elements may be combined as needed or desired to effectuate the impedance matching. These may be multiple capacitors, multiple inductors, or some mix thereof, e.g., a capacitor and an inductor. The last may be implemented through a capacitor as described, co-located with a ferrite piece that changes the inductance of a second element as described.

Figure 13:
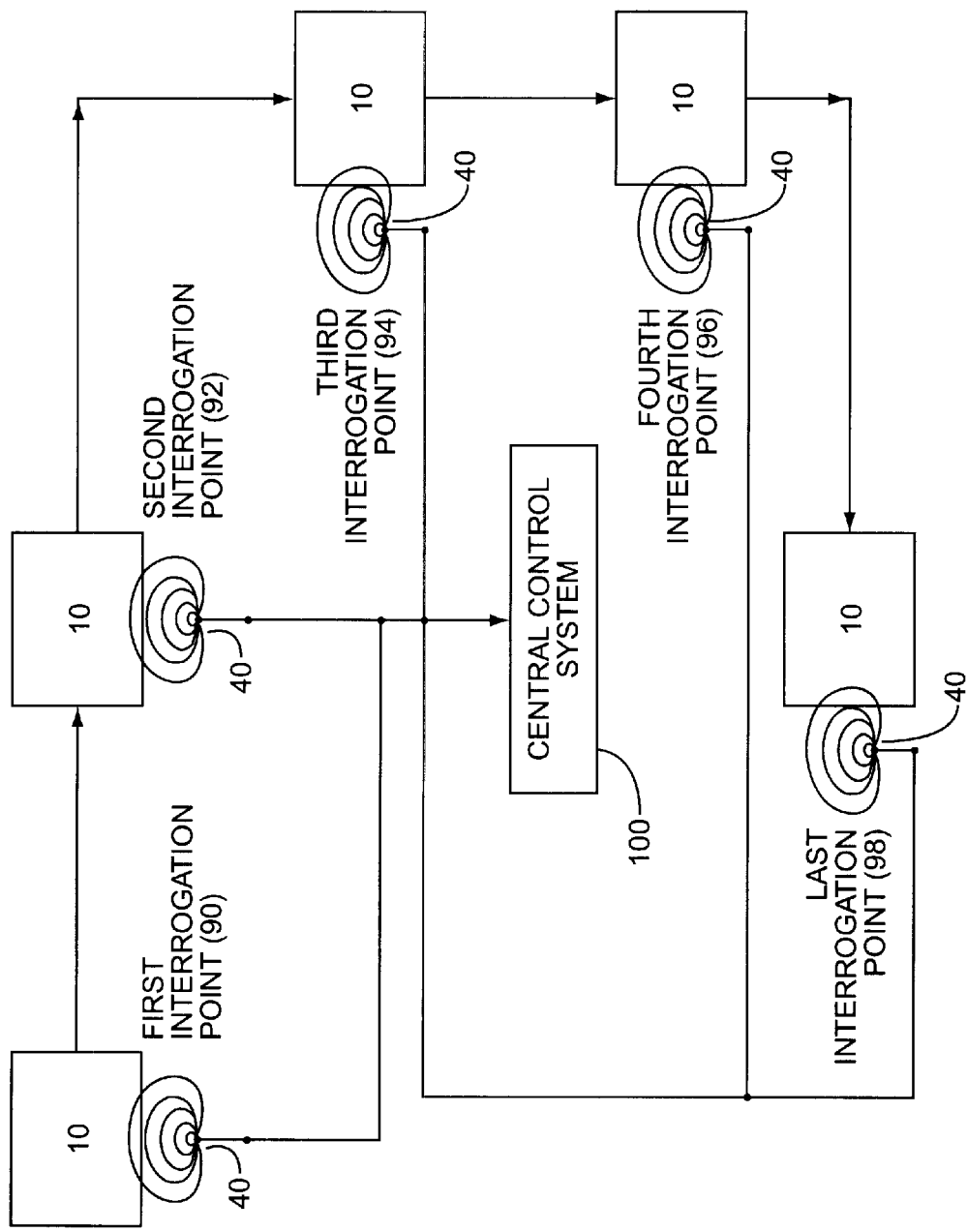
FIG. 13 is a schematic diagram illustrating a tracking and information system to track containers having a transponder.

FIG. 13 illustrates a tracking system in which containers 10 containing transponders 30 can be tracked through an environment such as a factory or distribution facility. For example, the transponder 30 connected to container 10 could pass a first interrogation point 90 that includes an interrogation reader 40. When the container 10 and its transponder 30 is in the presence of the interrogation reader 40 as described previously, a message containing information and/or a specific request for information may be transmitted by the interrogation reader 40 and received by the transponder 30. This process continues as the container 10 moves to a second interrogation point 92, a third interrogation point 94, a fourth interrogation point 96, and on to a last interrogation point 98.

A central control system 100 maintains the information from the interrogation readers 40 and monitors the movement of the containers 10 through the facility. The information received by each of the interrogation readers 40 may be forwarded to the central control system 100 either through direct wire or LAN connection. The central control system 100 could also send information to the interrogation reader 40 to be transmitted to the transponder 30 for identification purposes. The central control system 100 tracks the expected location of the containers 10 and may be alerted if it expects to receive information about a particular container and does not.

During commissioning of each container 10, it may be necessary to place the container 10 containing the transponder 30 in range of an interrogation reader 40 in order to erase previously stored information in memory 36 or to store particular data or configuration information about the container 10 in memory 36 for later use.

In the foregoing description, like-reference characters designate like or corresponding parts throughout the several views. Certain modifications and improvements will occur to those skilled in the art upon a reading of the foregoing description. It should be understood that the present invention is not limited to any particular type of container or slot arrangement. One of ordinary skill in the art will recognize that there are different manners in which containers with slots can be used to provide antenna functionality for a wireless communication device in accordance with the present invention. It should be understood that all such modifications and improvements have been deleted herein for the sake of conciseness and readability, but are properly within the scope of the following claims.

What is claimed is:

1. A device for identifying a container having a slot, comprising:
   a wireless communication device mounted on the container to communicate remotely information associated with the container;
   a slot antenna formed by electronically associating said wireless communication device to the slot; and
   a variable reactance element including sub-elements whose proximity changes as a function of changes in a width associated with the slot, thereby changing reactance characteristics of said slot antenna.

2. The device of claim 1, wherein said variable reactance element is a variable capacitor.

3. The device of claim 2, wherein said variable capacitor's capacitance increases as the width associated with the slot decreases.

4. The device of claim 2, wherein the variable capacitor's capacitance decreases as the width associated with the slot decreases.

5. The device of claim 2, wherein said variable capacitor includes two parallel plates positioned on flanges.

6. The device of claim 1, wherein said variable reactance element is a variable inductor.

7. The device of claim 6, wherein said variable inductor includes a helical coil having loops, said loops comprising said sub-elements.

8. The device of claim 6, wherein the variable inductor's inductance increases as the width associated with the slot decreases.

9. The device of claim 6, wherein the variable inductor's inductance decreases as the width associated with the slot decreases.

10. The device of claim 1, wherein the slot is formed from a rim edge and an outer wall.

11. The device of claim 10, wherein said variable reactance element comprises a clip positioned between said rim edge and said outer wall.

12. A system for identifying a container, comprising:
    a container having a slot;
    a wireless communication device mounted on the container to communicate remotely information associated with the container;
    a slot antenna formed by electronically associating said wireless communication device to said slot, said slot antenna having a variable impedance as a function of a width associated with the slot; and
    an impedance matching network including a variable reactance element associated with said wireless communication device, said impedance matching network matching impedances between said slot antenna and said wireless communication device.

13. The system of claim 12, wherein said variable reactance element comprises a variable capacitor.

14. The system of claim 13, wherein said variable capacitor increases capacitance as said width decreases.

15. The system of claim 13, wherein said variable capacitor decreases capacitance as said width decreases.

16. The system of claim 12, wherein said variable reactance element comprises a variable inductor.

17. The system of claim 16, wherein said variable inductor increases inductance as said width decreases.

18. The system of claim 16, wherein said variable inductor decreases inductance as said width decreases.

19. A method of monitoring a container comprising:
    associating a wireless communication device with the container;
    moving the container through at least one interrogation point containing an interrogation reader;
    communicating monitoring information associated with the container between said wireless communication device and said interrogation reader through a slot antenna formed by a slot within the container; and
    matching impedances between said slot antenna and said wireless communication device with an impedance matching network.

20. The method of claim 19, wherein matching impedances comprises varying a variable reactance element within said impedance matching network.

21. The method of claim 20, wherein varying a variable reactance element comprises varying a variable capacitor.

22. The method of claim 21, wherein varying a variable capacitor comprises compressing two parallel plates as a width associated with said slot decreases.

23. The method of claim 21, wherein varying a variable capacitor comprises moving two parallel plates from substantially overlapped positions to positions where said parallel plates have less overlapping areas as a width associated with said slot decreases.

24. The method of claim 20, wherein varying a variable reactance element comprises varying a variable inductor.

25. The method of claim 24, wherein varying a variable inductor comprises compressing a helical coil, as a width associated with said slot decreases.

26. The method of claim 24, wherein varying a variable inductor comprises spreading a helical coil, as a width associated with said slot decreases.

27. The method of claim 19, wherein matching impedances comprises varying at least one variable reactance element within said impedance matching network.

28. The method of claim 19, wherein matching impedances comprises varying a plurality of variable reactance elements within said impedance matching network.

* * * * *